J. A. NICHOLS.
NUT-LOCK.
No. 193,272. Patented July 17, 1877.
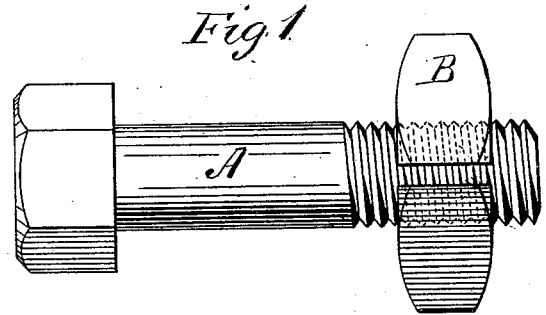
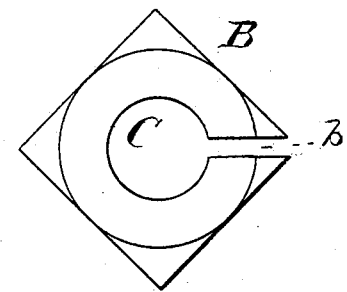
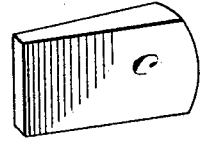
WITNESSES
INVENTOR
John A. Nichols,
by E. W. Anderson,
ATTORNEY

United States Patent Office.

JOHN A. NICHOLS, OF PITTSBURG, PENNSYLVANIA.

IMPROVEMENT IN NUT-LOCKS.

Specification forming part of Letters Patent No. 193,272, dated July 17, 1877; application filed April 7, 1877.

*To all whom it may concern:*

Be it known that I, JOHN A. NICHOLS, of Pittsburg, in the county of Allegheny and State of Pennsylvania, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a headed bolt with my cleft nut applied, and Figs. 2 and 3 are detail views.

This invention has relation to improvements in nut-locks; and it consists in the construction and novel arrangement in connection with an ordinary headed bolt of a right cylindrical or right prismatic inwardly-springing and regularly-threaded nut, which, when in normal tension, has a tap-hole of a diameter less than that of the bottom of the bolt-thread, and a cleft which remains open for the insertion of an expanding-tool, as and for a purpose hereinafter shown and described.

In the annexed drawings, the letter A designates an ordinary headed bolt, and B a right cylindrical or right prismatic nut, having a screw-threaded aperture, C, of less diameter than that of the bolt-thread. *b* designates a cleft slot leading into said aperture; and *c* a metallic wedge-key, which, when forced in cleft *b* by any suitable means, will expand the prismatic nut, enlarge its aperture, and allow it to be screwed upon the bolt. The nut is regularly threaded, and when applied to the bolt, the wedge being removed, springs inward and binds upon said bolt.

The manner of operating my improved device is as follows: When the headed bolt A has been passed through the articles to be joined, the wedge-key is forced into cleft *b* until the prismatic nut is sufficiently expanded to admit the said bolt; the said nut may be then easily screwed home. This being accomplished, the wedge is removed from the slot, when the nut will contract, because of the elasticity of the material, and bind upon the bolt with great pressure, thus preventing all backward rotation.

Should it be required at any time to remove the nut, I forcibly reinsert the wedge in the slot, and open or expand the nut, when the latter may then be easily removed by hand, thus doing away with the use of wrenches and the like.

It is evident that, the diameter of the screw-threaded aperture of the cleft nut being less than that of the bolt, it will be impossible to screw said nut on the bolt beyond a short distance without materially injuring the threads of both bolt and nut; but, as above described, by forcing the wedge into the cleft, the nut is readily expanded, and may then be applied to the bolt to the required extent by hand; also, when the wedge is removed, the aperture will contract, and the nut will gripe the bolt by its natural elasticity.

My improved lock-nut will be found particularly useful in its application to railroad fish-bars, its construction being such that little or no expense will be entailed beyond the first cost of the bolt and nut.

I may either tap the nut before or after the cleft is made. In either case there will not be any difference in its working.

I am aware that a regularly-threaded right cylindrical collar, having projections from and outside of its perimeter, has been sprung on a threaded bolt, and against the face of a nut, to keep the nut from turning. This is not the nut itself, and if used as a nut the projections would interfere with its use in any place not much wider than the diameter of the nut, or having any obstacle near to the nut. My nut is a cylindrical or prismatic nut—*i. e.*, has a form of perimeter which has no such projections as are above mentioned.

I am also aware that a collar for the above purpose has been made, having one of the cleft ends bent or cut away from the plane of the bearing-face of said collar. This causes the spring end to clamp against the sides of the bolt-thread, instead of directly into the bolt-thread, as does my nut, whose faces are at right angles to the planes of the sides, and whose thread has no cross-teeth or indentations, but is a regular screw-thread.

The above-specified constructions are not of my invention; but

What I do claim is—

A right cylindrical or prismatic inwardly-springing and regularly-threaded nut, which, when in normal tension, has a tap-hole of a diameter less than that of the bottom of the bolt-thread, and having a cleft which remains open for the insertion of an expanding-tool, substantially as specified.

In testimony that I claim the above I have hereunto subscribed my name in the presence of two witnesses.

JOHN A. NICHOLS.

Witnesses:
 ONWARD BATES,
 JAMES E. ROGERS.